US010320076B2

(12) United States Patent
Fang et al.

(10) Patent No.: US 10,320,076 B2
(45) Date of Patent: Jun. 11, 2019

(54) ANTENNA TRANSMISSION DEVICE AND ANTENNA

(71) Applicant: TONGYU COMMUNICATION INC., Zhongshan, Guangdong (CN)

(72) Inventors: Tieyong Fang, Zhongshan (CN); Bin Wang, Zhongshan (CN); Gang Cheng, Zhongshan (CN); Mulin Liu, Zhongshan (CN); Zhuohong Huang, Zhongshan (CN); Lei Shi, Zhongshan (CN); Zeming Fang, Zhongshan (CN); Cailong Yue, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 0 days.

(21) Appl. No.: 16/062,453

(22) PCT Filed: Jun. 18, 2016

(86) PCT No.: PCT/CN2016/086320
§ 371 (c)(1),
(2) Date: Jun. 14, 2018

(87) PCT Pub. No.: WO2017/101284
PCT Pub. Date: Jun. 22, 2017

(65) Prior Publication Data
US 2019/0027825 A1  Jan. 24, 2019

(30) Foreign Application Priority Data

Dec. 17, 2015  (CN) .......................... 2015 1 0957038

(51) Int. Cl.
*F16H 1/28* (2006.01)
*F16H 1/32* (2006.01)
(Continued)

(52) U.S. Cl.
CPC ................. *H01Q 3/32* (2013.01); *F16H 1/28* (2013.01); *F16H 1/32* (2013.01); *F16H 31/001* (2013.01);
(Continued)

(58) Field of Classification Search
CPC ......... H01Q 3/32; H01Q 1/1264; H01Q 21/22
See application file for complete search history.

(56) References Cited

U.S. PATENT DOCUMENTS 3,686,974 A * 8/1972 Little, Jr. .................. F16H 1/22
192/415
3,872,578 A * 3/1975 Ullom ..................... B23P 11/00
29/525
(Continued)

FOREIGN PATENT DOCUMENTS

CN          204793203 U    11/2015
WO   WO-2007107051 A1 *  9/2007 ............... H01Q 3/02

OTHER PUBLICATIONS

Jul. 29, 2016 Written Opinion issued in PCT/CN2016/086320.
Jun. 19, 2017 Translation of Office Action issued in Chinese Patent Application No. 2015109570382.

*Primary Examiner* — Dameon E Levi
*Assistant Examiner* — Jennifer F Hu
(74) *Attorney, Agent, or Firm* — Oliff PLC

(57) ABSTRACT

An antenna transmission apparatus includes: a housing including an upper cover and a lower cover, and an input shaft and at least two sets of output shafts that are rotatably mounted between the upper cover and the lower cover; and further includes a planetary gear position selection assembly and a unidirectional control assembly. Each set of output shafts includes an output shaft and an auxiliary shaft in transmission fit with the output shaft; the planetary gear position selection assembly includes a planetary gear; the unidirectional control assembly can control the planetary (Continued)

gear to implement position selection and positioning; and the position selection and bidirectional rotation output of the output shafts may be implemented by using only one motor. The antenna transmission apparatus of the present invention is simple in structure, light in weight, stable, and easy to operate.

18 Claims, 5 Drawing Sheets

(51) Int. Cl.
*H01Q 1/12* (2006.01)
*H01Q 1/24* (2006.01)
*H01Q 3/32* (2006.01)
*F16H 31/00* (2006.01)
*H01Q 21/22* (2006.01)

(52) U.S. Cl.
CPC .......... *H01Q 1/1264* (2013.01); *H01Q 1/246* (2013.01); *H01Q 21/22* (2013.01)

(56) References Cited

U.S. PATENT DOCUMENTS

| | | | |
|---|---|---|---|
| 2003/0177862 A1* | 9/2003 | Chan | B23Q 5/34 |
| | | | 74/661 |
| 2010/0201590 A1* | 8/2010 | Girard | H01Q 1/246 |
| | | | 343/766 |
| 2010/0201591 A1* | 8/2010 | Girard | H01Q 1/246 |
| | | | 343/766 |
| 2013/0307728 A1* | 11/2013 | Berger | H01Q 3/32 |
| | | | 342/374 |

* cited by examiner

ANTENNA TRANSMISSION DEVICE AND ANTENNA

BACKGROUND

Technical Field

The present invention relates to the field of mobile communications antennas, and in particular, to a transmission apparatus for a phase shifter of a base station antenna.

Related Art

In mobile communications technologies, a radiation angle of a base station antenna needs to be adjusted to cover different mobile communications areas, and the antenna is generally adjusted by using an antenna transmission mechanism or a remote electrical tilt apparatus. The antenna transmission mechanism has a significant impact on the costs, weight, and size of the antenna. Currently, phase shifters of the base station antennas on the market are mostly one phase shifter driven by one motor. The costs are high, the weight is heavy, and occupied space is large, and there are disadvantages such as a complex structure, being difficult to produce, and high costs.

SUMMARY

The technical problem to be resolved in the present invention is to provide an antenna transmission apparatus aimed at resolving problems of an antenna transmission apparatus in the prior art, such as the number of motors is large, the volume is large, the weight is heavy, the structure is complex, and a phase shifter cannot be bidirectionally adjusted.

The technical solution of the present invention is to provide an antenna transmission apparatus, including a housing consisting of an upper cover and a lower cover, and an input shaft and at least two sets of output shafts that are rotatably mounted between the upper cover and the lower cover, where the antenna transmission apparatus further includes a planetary gear position selection assembly and a unidirectional control assembly; each set of output shafts includes an output shaft and an auxiliary shaft in transmission fit with the output shaft; the planetary gear position selection assembly includes a planetary gear; the unidirectional control assembly can control the planetary gear to move, when driven by the input shaft to rotate in a first rotation direction, along a track surrounded by the sets of output shafts to a predetermined position at which the planetary gear can be in transmission fit with any set of output shafts, so that the position is selected, or to rotate at the predetermined position when driven by the input shaft to rotate in a second rotation direction that is a reverse rotation direction of the first rotation direction, and drive a corresponding output shaft to rotate and output; the planetary gear rotates in the second rotation direction to be respectively in transmission fit with the output shaft or the auxiliary shaft in a same set of output shafts, so as to respectively obtain bidirectional rotation output of the output shafts; and the input shaft can be driven by external power to bidirectionally rotate, correspondingly, to respectively drive the planetary gear to rotate in the first rotation direction or rotate in the second rotation direction.

Further, the transmission fit between the planetary gear and the input shaft and each set of output shafts is transmission fit of gear engagement.

Further, the planetary gear and the input shaft and each set of output shafts are respectively cylindrical gear shafts, and upper ends and lower ends of the gear shafts correspond to the upper cover and the lower cover; upper ends and lower ends of the output shaft and the auxiliary shaft in each set of output shafts are respectively rotatably sleeved in support holes formed on the upper cover and the lower cover; the lower end of the output shaft in each set of output shafts extends out of the support hole on the lower cover to perform rotation output; an upper end and a lower end of the input shaft are respectively rotatably sleeved in center holes formed on the upper cover and the lower cover; and the input shaft is parallel to the output shafts.

Further, the planetary gear position selection assembly further includes a gear ring, and a side wall of the gear ring is provided with axially parallel racks; the planetary gear engages with the gear ring; the unidirectional control assembly controls the gear ring to unidirectionally rotate; the gear ring and the output shafts non-rotatably fit the planetary gear when the planetary gear rotates in the first rotation direction; and the gear ring and the output shafts rotatably fit the planetary gear when the planetary gear rotates in the reverse direction.

Further, the gear ring is an inner gear ring, the racks are disposed on an annular inner side wall of the inner gear ring; the planetary gear is located at an annular inner portion of the inner gear ring, and a lower end of the planetary gear engages with the inner gear ring; each set of output shafts is arranged at a periphery of the inner gear ring, and an upper end of the planetary gear can respectively engage with each set of output shafts; and the input shaft is located at a center of the inner gear ring and engages with the planetary gear.

Further, a lower end surface of the gear ring is provided with a bottom disc, and the bottom disc covers the lower end surface of the gear ring; and a center of the bottom disc is provided with a center hole, and a lower end of the input shaft runs through the center hole.

Further, the unidirectional control assembly includes several unidirectional clamping blocks and a unidirectional gear; the unidirectional clamping blocks are clamped in backlashes of the gear and can unidirectionally relatively rotate to be tightly clamped in a reverse direction and fit the unidirectional gear; the unidirectional clamping blocks are mounted on a lower end surface of the bottom disc of the gear ring and synchronically rotate with the bottom disc of the gear ring; the unidirectional gear is fixed to the lower cover; a center of the unidirectional gear is provided with a center hole; a cylindrical protrusion is formed at the center of the bottom disc and is relatively rotatably sleeved in the center hole of the unidirectional gear; and the lower end of the output shaft relatively rotatably runs through the center hole of the bottom disc, the cylindrical protrusion, and the center hole of the unidirectional gear.

Further, the planetary gear position selection assembly further includes a planetary bracket configured to support the planetary gear; a center of the planetary bracket is provided with a center hole bearing sleeve; the center hole bearing sleeve of the planetary bracket is rotatably sleeved in the center hole of the bottom disc; the lower end of the input shaft relatively rotatably runs through the center hole bearing sleeve of the planetary bracket and the center hole of the bottom disc; the planetary bracket is of a frame-shaped bracket structure and includes a bottom portion and two side arms axially and parallelly extending upward from two ends of the bottom portion; an angle exists between the two side arms and the two side arms are parallel to the input shaft; the two side arms are respectively a bearing rotatably supporting the planetary gear and a position selection mark configured to relatively mark a position of the planetary gear; a lower end of the planetary gear is rotatably sleeved over the bearing of the planetary bracket, and an upper end of the planetary gear is provided with a ball pin; the upper cover is provided with several unidirectional positioning holes; each positioning hole includes a unidirectional sliding surface facing a same direction; the planetary gear can move, when rotating in the first rotation direction, towards the direction of the unidirectional sliding surface and along an arrangement track of the unidirectional positioning holes to the predetermined positioning holes by using the ball pin at the upper end of the planetary gear; and when the planetary gear rotates in the second rotation direction opposite to the first rotation direction, the planetary gear can be limited in the positioning holes by the unidirectional positioning holes, rotate in the second rotation direction, and engage with the corresponding output shaft or the auxiliary shaft.

Further, the upper cover is provided with an annular protrusion portion used as a moving channel of the position selection mark; and the annular protrusion portion is provided with a zero position monitoring portion for the position selection mark, and the zero position monitoring portion is internally provided with a sensor configured to sense a pass of the position selection mark, record the position as a zero position, and control rotation times of the planetary bracket by using a program, to implement position selection of the output shaft.

Further, the present invention also provides a mobile antenna, including several phase shifters and the antenna transmission apparatus described above, where each phase shifter is connected to an output shaft of the antenna transmission apparatus by using a connection mechanism, and rotation output of the output shaft correspondingly adjusts the phase shifters.

The technical effects of the present invention: The present invention controls motion of any output shaft by using one drive motor, and implements position selection and rotation output of the output gear shaft by using forward or reverse rotation of the motor, therefore, response time of adjusting the output shaft is short, the structure is compact, the weight is light, the reliability is high, and the number of motors may be reduced to greatly reduce costs of the antenna.

BRIEF DESCRIPTION OF THE DRAWINGS

FIG. 10(a) and FIG. 10(b) are respectively different visual angles.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the protection scope of the present invention.

The technical solutions in the present invention are described below by using specific embodiments.

Figure 1:
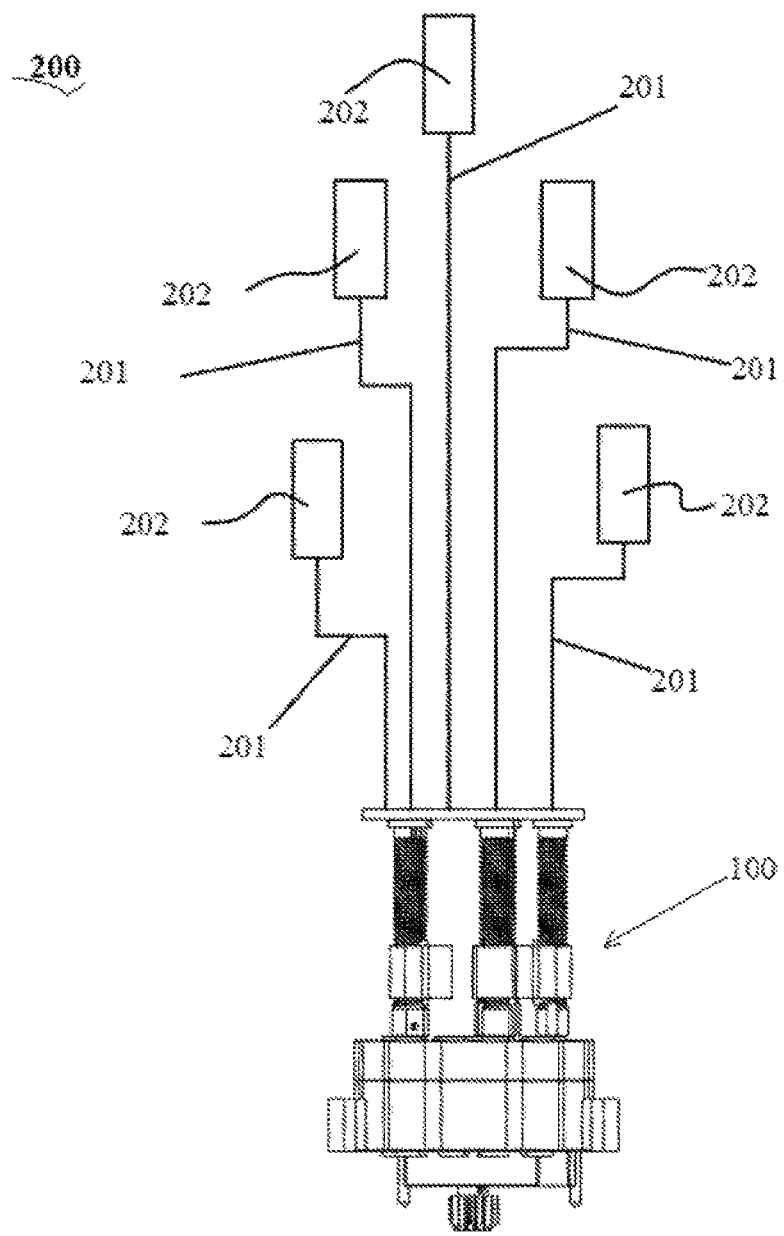
FIG. 1 is a diagram of an adjusting principle of a phase shifter of a mobile communications antenna according to an embodiment of the present invention.
Figure 2:
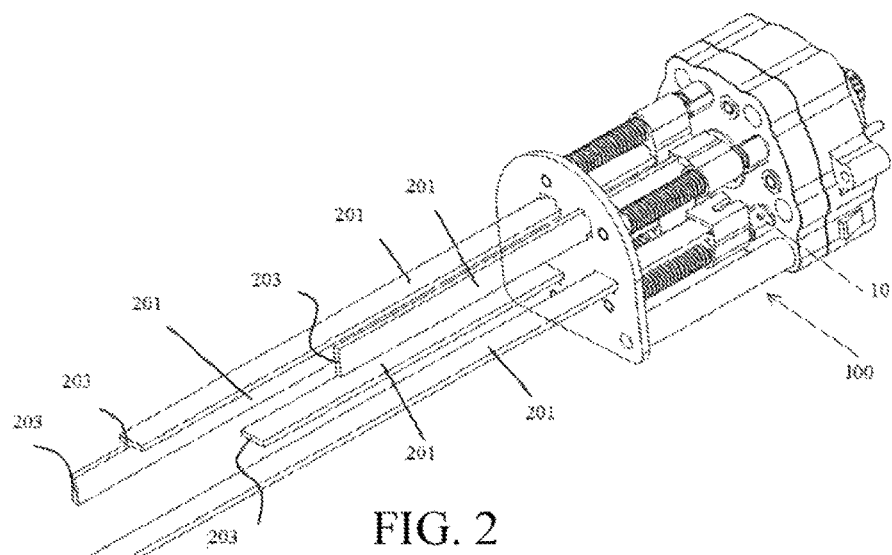
FIG. 2 is another diagram of an adjusting principle of a phase shifter according to an embodiment of the present invention.
Figure 3:
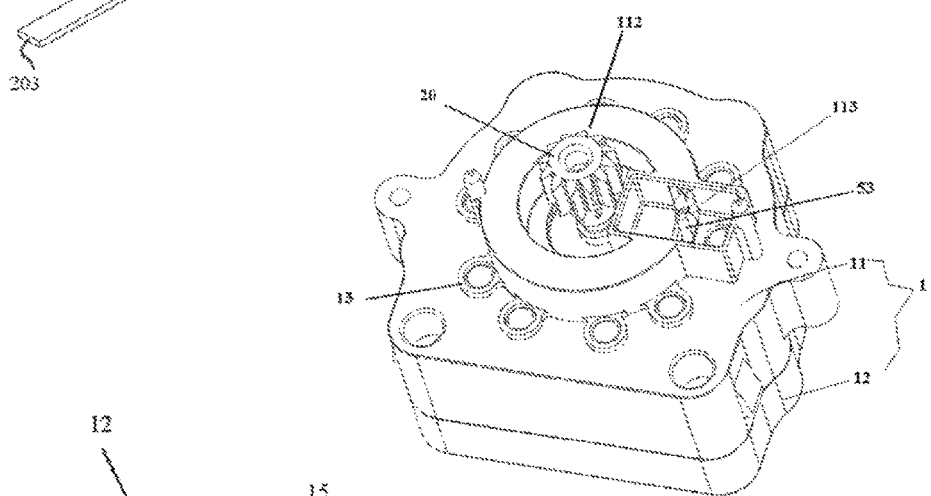
FIG. 3 is a three-dimensional view of an antenna transmission apparatus according to an embodiment of the present invention.
Figure 4:
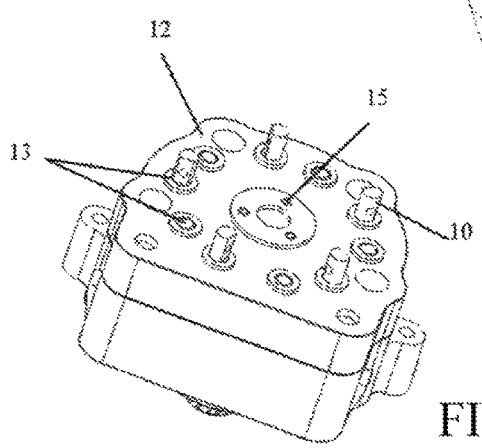
FIG. 4 is a three-dimensional view of another visual angle of an antenna transmission apparatus according to an embodiment of the present invention.
Figure 5:
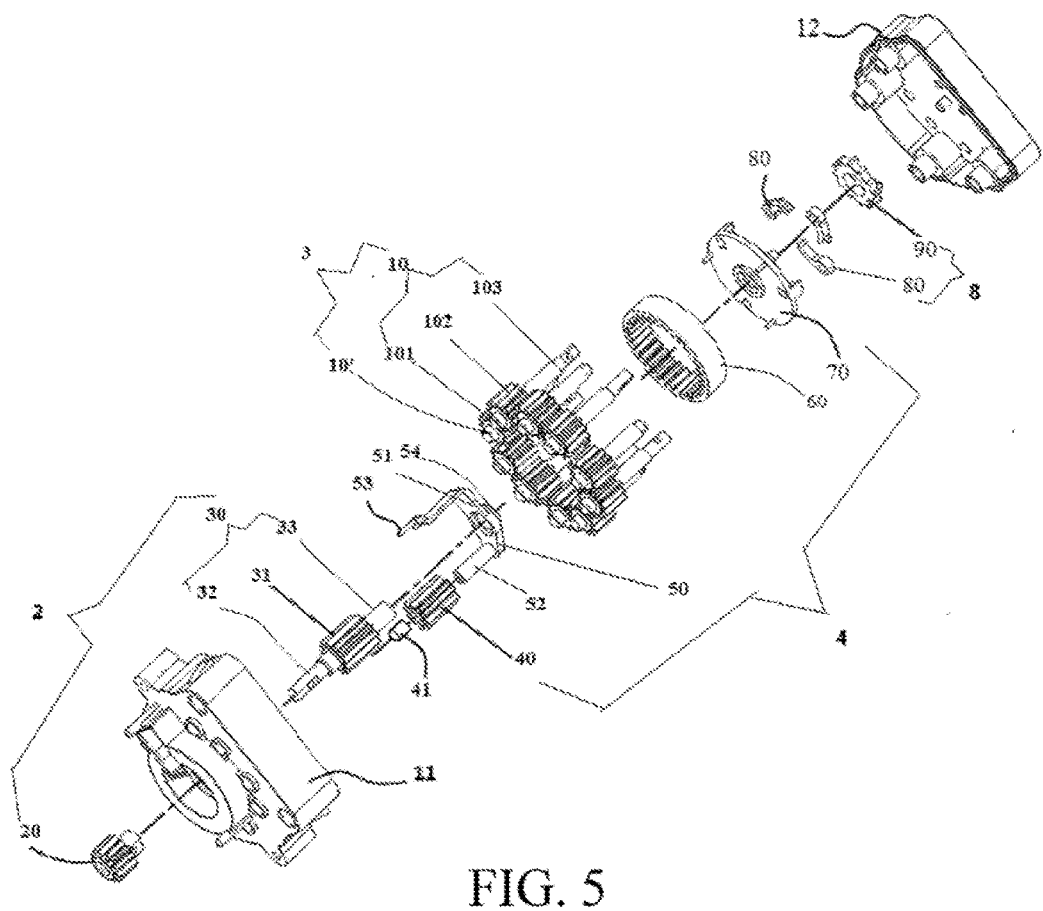
FIG. 5 is an exploded diagram of an antenna transmission apparatus according to an embodiment of the present invention.
Figure 6:
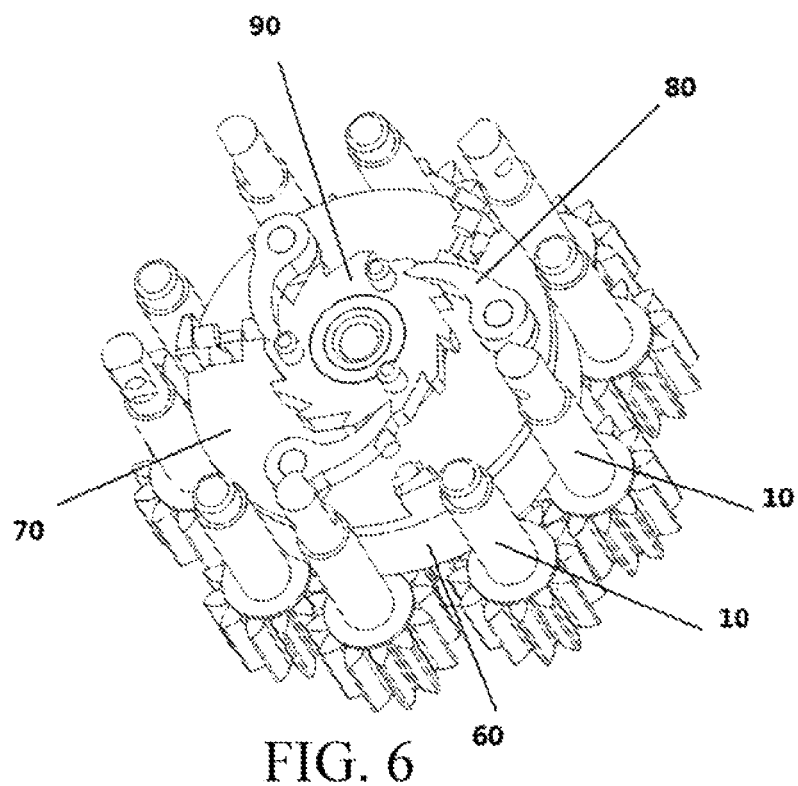
FIG. 6 is a three-dimensional view of an internal structure of an antenna transmission apparatus according to an embodiment of the present invention.
Figure 7:
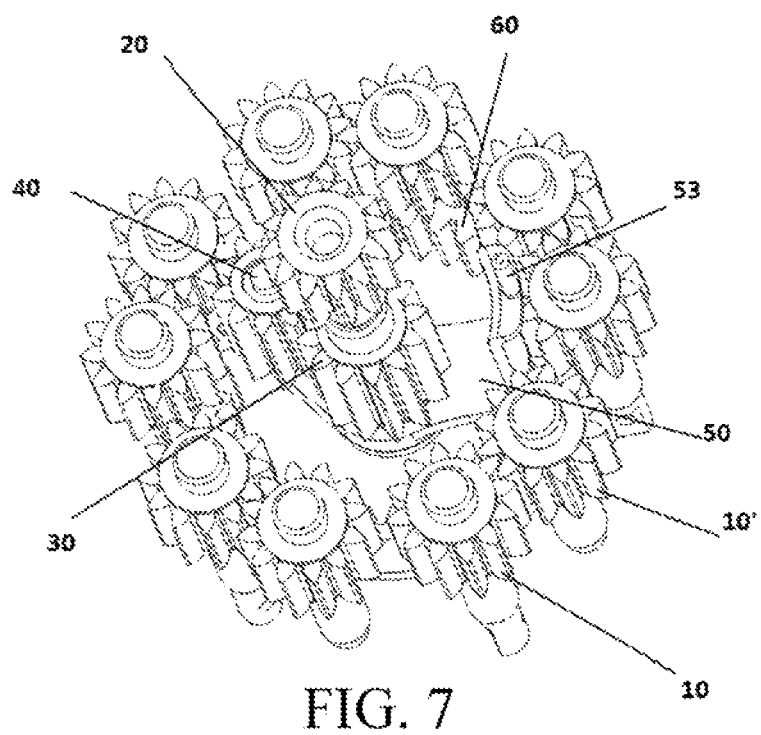
FIG. 7 is a three-dimensional view of another visual angle of an internal structure of an antenna transmission apparatus according to an embodiment of the present invention.
Figure 8:
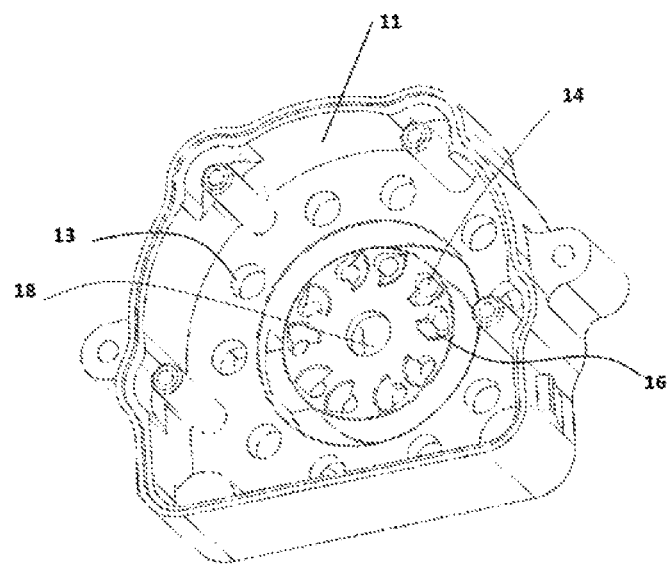
FIG. 8 is a three-dimensional view of an upper cover of an antenna transmission apparatus according to an embodiment of the present invention.
Figure 9:
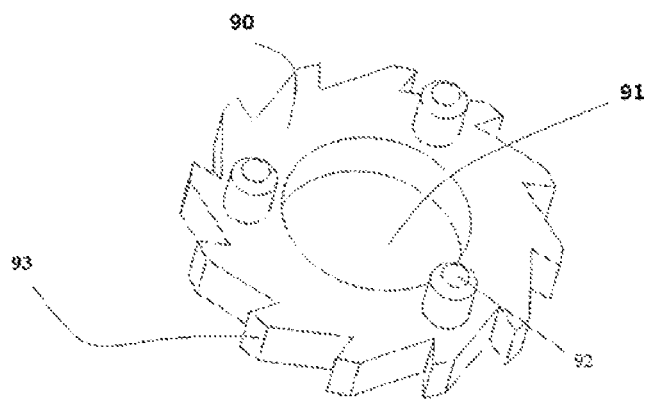
FIG. 9 is a three-dimensional view of a unidirectional gear of an antenna transmission apparatus according to an embodiment of the present invention.
Figure 10:
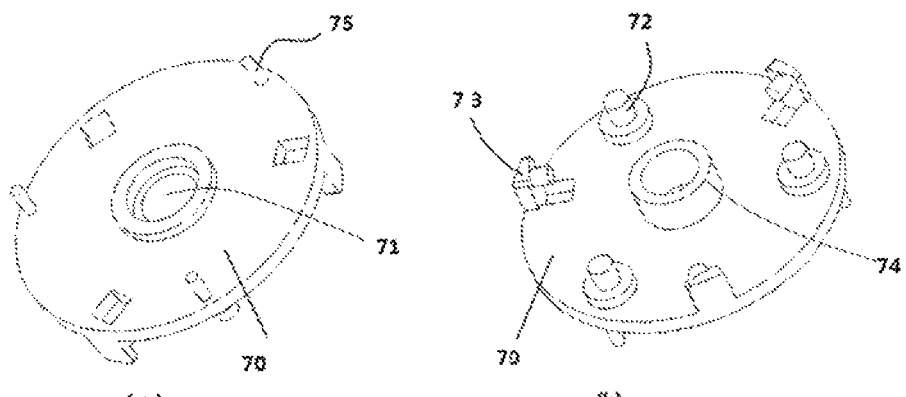
FIG. 10 is a three-dimensional view of a bottom disc of an antenna transmission apparatus according to an embodiment of the present invention, where

Referring to FIG. 1 and FIG. 2, a plurality of phase shifters 202 is disposed in a mobile communications antenna 200. To obtain a better radiation characteristic and electrical characteristic, phases of the phase shifters 202 need to be adjusted. Adjustment for the phase shifters is implemented by using an antenna transmission apparatus 100. Each phase shifter 202 is correspondingly connected to an output shaft 10 in the antenna transmission apparatus 100 by using a strut 201, the strut 201 is driven to move by rotation output of the output shaft 10 of the transmission apparatus 100, and eventually, a downtilt of the corresponding phase shifter 202 is correspondingly adjusted to obtain a particular radiation characteristic. A top end of each strut 201 is provided with a phase shifter interface 203 configured to connect to each phase shifter 202. The transmission apparatus 100 is described in detail below.

Referring to FIG. 3 to FIG. 10, the embodiments of the present invention provide an antenna transmission apparatus 100, including:

a housing 1, including an upper cover 11 and a lower cover 12 that cover each other to internally form a cavity to accommodate various parts;

a power assembly 2, including a motor represented by an input gear 20, and an input gear shaft 30 used as a center shaft;

several sets of output shafts 3, where each set of output shafts includes an output gear shaft 10 and an auxiliary gear shaft 10', and the output gear shaft 10 and the auxiliary gear shaft 10' are engageably in transmission fit with each other;

a position selection assembly 4, including: a planetary gear 40, a planetary bracket 50 provided with a center hole 54, and an inner gear ring 60 provided with a bottom disc 70; and a unidirectional control assembly 8, including: several unidirectional clamping blocks 80, and a unidirectional gear 90 provided with a center hole 91.

The housing 1 of the transmission apparatus 100 of the embodiments of the present invention includes the upper and lower covers 11 and 12, end surfaces of the upper and lower covers 11 and 12 are respectively provided with support holes 13 configured to mainly support and fix the output gear shafts 10 and the auxiliary gear shafts 10'. The upper and lower covers 11 and 12 internally include a planetary gear position selection assembly 4, and the planetary gear position selection assembly 4 includes the planetary gear 40 driven by an input shaft 30, the planetary bracket 50, and the gear ring 60. In addition, a ball pin 41 is inserted into an upper end of the planetary gear 40, a lower portion of the gear ring 60 is the bottom disc 70, and the gear ring 60 and the bottom disc 70 are fixedly connected together by using a gear ring fixing shaft 75. The planetary gear 40 simultaneously engages with the gear ring 60 and any shaft in five sets of output shafts 3, and the sets of output shafts 3 are circumferentially arranged on an upper portion of the gear ring 60. A lower portion of the bottom disc 70 is the unidirectional control assembly 8. The assembly 8 includes three (but is not limited to three) unidirectional clamping blocks 80 and a position selection gear 90, a center mounting hole 91 of the position selection gear 90 is sleeved over a center cylindrical protrusion 74 of the bottom disc 70, and a lower end surface of the position selection gear 90 is fixedly connected to the lower cover 12 of the transmission apparatus by using a fixing shaft 92.

The unidirectional clamping blocks 80 are mounted to a unidirectional clamping block fixing base 72 of a base by using shaft-hole fit.

In the transmission apparatus 100 of the present invention, only the input gear 20 is mounted outside the housing 1 of the transmission apparatus 100, and all other parts are mounted inside the housing 11. The transmission apparatus implements selection of the output gear shaft 10 and rotation output of the output gear shaft 10 by forward or reverse rotation of the input gear 20, so as to adjust an antenna apparatus with a plurality of phase shifters by using only one motor.

The several output gear shafts 10 are at least two output gear shafts, and each output shaft 10 is a cylindrical gear shaft and includes a cylindrical gear portion 102 and cylindrical mounting portions corresponding to upper and lower tail ends 101 and 103 of the cylindrical gear shaft. The cylindrical gear portion 102 is parallel racks axially and evenly disposed on an outer circumference of a cylindrical shaft, and is in transmission fit with the planetary gear 40 by means of gear engagement. The upper and lower ends 101 and 103 of the output gear shafts 10 are respectively rotatably mounted in the support holes 13 formed on the upper and lower covers 11 and 12, and the lower ends extend out of the support holes 13 of the lower cover 12 to connect to the strut 201. A length of the cylindrical gear portion of the output gear shaft 10 is set according to specific requirements. To implement forward and reverse adjustment of the phase shifter, each output gear shaft 10 is provided with the auxiliary gear shaft 10' that rotates to fit the output gear shaft 10, to form a set of output shafts 3. In a same set of output shafts 3, the output gear shaft 10 and the auxiliary gear shaft 10' engageably rotate to fit each other; and in different sets of output shafts 3, the output gear shaft 10 and the auxiliary gear shaft 10' non-engageably rotate to fit each other. The output gear shaft 10 may be directly driven by the planetary gear 40 to perform forward or reverse rotation output; alternatively, the planetary gear 40 drives the auxiliary gear shaft 10' in a same set and the auxiliary gear shaft 10' drives the output gear shaft 10 in the same set to perform forward or reverse rotation output. Therefore, bidirectional rotation output of the output gear shaft 10 is implemented, and the strut 201 drives the phase shifters to perform bidirectional adjustment. The auxiliary gear shaft 10' is not connected to the strut 201, and only the output gear shaft 10 in each set of output shafts 3 can perform rotation output and is connected to the strut 201.

The output gear shafts 10 and the auxiliary gear shafts 10' are arranged according to a motion track of the planetary gear 40, so that the planetary gear 40 may be respectively in rotation fit with each output gear shaft 10 auxiliary gear shaft 10' after selecting a position. In this embodiment, the output gear shafts 10 and the auxiliary gear shafts 10' are axially and parallelly arranged at a same arc or circle.

The planetary gear 40 may move to select a position and is located inside a track surrounded by the output gear shafts 10 and the auxiliary gear shafts 10'. In this embodiment, the output gear shafts 10 and the auxiliary gear shafts 10' surround a cylinder, and the planetary gear 40 is located inside the cylinder, may revolve around the center shaft to select a position and is mounted in a circumference of the output gear shafts 10 and the auxiliary gear shafts 10', and may be engageably in rotation fit with any output gear shaft 10 or auxiliary gear shaft 10'. Correspondingly, the support holes 13 on the upper cover 11 and the lower cover 12 respectively form a circular track on the upper cover 11 and the lower cover 12, and every two support holes are separate by a certain arc distance. In this embodiment, there are five output gear shafts 10 that correspondingly and respectively form five sets of output shafts 3 with five auxiliary gear shafts 10'. The support holes 13 on the upper cover 11 or the lower cover 12 are respectively five pairs of support holes 13, that is, ten support holes 13, and are respectively located on a same arc.

In this embodiment, in the antenna transmission apparatus 100, a side that is of the planetary gear 40 and that faces the center shaft, that is, an inner side, engages with the gear portion of the input shaft 30 that is located on the center shaft; and at a side that extends outward from the center shaft, that is, an outer side, a lower end of the planetary gear 40 engages with the racks of the inner gear ring 60, and at the same side, an upper end of the planetary gear 40 engages with the gear of the output shaft 10 or the auxiliary gear shaft 10'. By using this position and fit relationship, the input shaft 30 may drive the planetary gear 40 to rotate, and the planetary gear 40 drives the inner gear ring 60 and the output shaft 10 or the auxiliary shaft 10' to simultaneously rotate or to not rotate. When the inner gear ring 60 and the output shaft 10 or the auxiliary shaft 10' do not rotate, the planetary gear 40 revolves around an inner wall of the gear ring 60 to select a position, and when the inner gear ring 60 and the output shaft 10 or the auxiliary shaft 10' rotate, output is implemented, and correspondingly, the planetary gear 40 rotates.

The input gear 20 is also a cylindrical gear shaft, and is coaxially mounted to the center shaft of the transmission apparatus 100 by using the input shaft 30 located on the center shaft. The input gear 20 is mounted outside the transmission apparatus 100, that is, at the outer end of the center shaft of the upper cover 11. The input gear 20 is gear-driven by an external motor (not shown), to synchronically drive the input shaft 30 to rotate. The input gear 20 is mounted at one end of the input shaft 30, and the input gear 20 and the input shaft 30 fit each other in such a manner that the two cannot rotate relative to each other, but can synchronically rotate. In an implementation, the input gear 20 is mounted at the input shaft 30 by using a keyslot and/or a dowel pin. The input shaft 30 and the input gear 20 synchronically rotate. The input shaft 30 is provided with axially parallel racks, and therefore, actually, is also a cylindrical gear shaft including a cylindrical gear portion 31 and two ends of the shaft, that is, an upper end 32 and a lower end 33. The gear portion 31 is racks axially, parallelly, and evenly arranged around a circumference of a cylinder. The gear portion 31 of the input shaft 30 is engageably in rotation fit with the planetary gear 40. The upper and lower ends 32 and 33 of the input shaft 30 are rotatably mounted on the center shaft between the upper and lower covers 11 and 12. The upper end 32 of the input shaft 30 is rotatably sleeved in a center shaft hole 18 of the upper cover 11 and extends out of the upper cover 11 to be sleeved in the input gear 20 located outside the upper cover 11. The lower end 33 of the input shaft 30 rotatably and sequentially runs through a center hole 54 of the planetary bracket 50, a center of the annular gear ring 60, a center hole 71 of the bottom disc 70, and is eventually sleeved and supported in a center hole 91 of the unidirectional gear 90. The unidirectional gear 90 is fixed onto the lower cover 12, therefore, two ends of the input shaft 30 are rotatably supported between the upper and lower covers 11 and 12, and the input shaft 30 is used as the center shaft to mount the position selection assembly 4 and the unidirectional control assembly 8 inside the housing 1. In this embodiment, the input gear 20 is sleeved over the upper end of the input shaft 30 to form a coupling gear structure, and the input gear 20 drives the input shaft 30 to synchronically rotate.

It may be understood that the input gear 20 may alternatively be in another form of power input, and the effect of the input gear 20 is to drive the input shaft 30 to rotate. Alternatively, a motor or another power form may directly drive, from the outside of the transmission apparatus 100, the input shaft 30 to rotate.

The planetary gear 40 is also a cylindrical gear shaft, and racks are parallelly and evenly disposed on a circumference of the cylinder in an axial direction. The planetary gear 40 is engageably in rotation fit with the input shaft 30, the output gear shaft 10, the auxiliary gear shaft 10', and the inner gear ring 60. A top end of the cylindrical shaft of the planetary gear 40 is provided with a ball pin 41 to form a telescopic shaft whose tail end is in a shape of a dome, is movable to be transposed and is inserted into several unidirectional positioning holes 14 formed on an inner bottom surface of the upper cover 11. The planetary gear 40 may move, by using the ball pin 41 at the top end, along an arrangement track of the unidirectional positioning holes 14 and along a unidirectional sliding surface 16 to a next positioning hole 14, so as to select a position, corresponding to that in this embodiment, the planetary gear 40 revolves around the center shaft or the output shaft 30 to select a position; alternatively, the planetary gear 40 rotates in the positioning hole 14 by using the ball pin 41 at the top end, to perform output. In this embodiment, corresponding to the quantities and positions of the output gear shafts 10 and the auxiliary gear shafts 10', there are ten positioning holes 14 in total, to ensure that the planetary gear can select and engage with any output gear shaft 10 or auxiliary gear shaft 10'. An arc surrounded by a circle of unidirectional positioning holes 14 formed on the upper cover 11 is located inside an arc surrounded by the support holes 13, and each unidirectional positioning hole 14 corresponds to each support hole 13, to enable the planetary gear 40 to engage with only one output shaft 10 or one auxiliary shaft 10' when rotating in each positioning hole 14. The center of the planetary gear 40 is hollow, and a tail end of the cylindrical shaft of the planetary gear 40 is sleeved over a support shaft 52 disposed on the planetary bracket 50 and can freely rotate. The planetary gear 40 is parallel to and is engageably in rotation fit with the input shaft 30. The planetary gear 40 is parallel to and is engageably in rotation fit with the input shaft 30, the output shaft 10, and the auxiliary gear shaft 10'. The input shaft 30 is transferred by the planetary gear 40, to be in transmission fit with the output shaft 10 and the auxiliary gear shaft 10'. Therefore, the input gear 20 eventually drives the output shaft 10 to perform rotation output.

The planetary bracket 50 is of a frame-shaped bracket structure and includes a bottom portion 51 and two side arms 52 and 53 axially and parallelly extending upward from two ends of the bottom portion 51. An angle exists between the two side arms 52 and 53 and the two side arms are parallel to the center shaft; and the two side arms are respectively used as a bearing supporting the planetary gear 40 and a position selection mark 53 relatively marking a position of the planetary gear 40.

The position selection mark 53 is configured to relatively mark the position of the planetary gear 40, to mark a selected output shaft 10. A center of the bottom portion 51 is provided with a center hole 54 and extends downward to form a bearing. The lower end of the input shaft 30 sequentially runs through the center hole 54 on the bottom portion 51 of the planetary bracket 50, the center of the gear ring 60, and the center shaft hole 71 of the bottom disc 70, and is eventually supported in the center shaft hole 91 of the unidirectional gear 90. Therefore, the planetary bracket 50 is sleeved in the center hole 71 of the bottom disc 70 by using the bearing formed by the center hole 54, and is eventually supported by the input shaft 30 in the bearing formed by the center hole 54 and the center hole 71 of the bottom disc 70, so that the planetary bracket 50 can freely rotate and is mounted inside the gear ring 60, but the planetary bracket 50 cannot axially move.

The bottom end or the lower end of the input shaft 30 freely rotatably runs through the center shaft hole, and freely rotatably fit each other.

Each output shaft 10 and a neighboring auxiliary shaft 10' are in transmission fit with each other and form a set of output shafts 3, to implement forward and reverse rotation output of the output shafts 10. The lower end 103 of the output shaft 10 freely rotatably extends out of the support hole 13 on the lower cover 12, and extends outward to be connected to the strut 201; and the lower end of the auxiliary shaft 10' freely rotatably presses against the support hole 13 but is not connected to the strut 201. Certainly, this embodiment is not limited to this connection structure. The output shaft 10 and the neighboring auxiliary shaft 10' in a same set are engageably in transmission fit with each other, and the output shafts 10 and the auxiliary shafts 10' in different sets are not in transmission fit with each other and are relatively independent. Correspondingly, support holes 13 corresponding to the output shaft 10 and the neighboring auxiliary shaft 10' in a same set are closer, and support holes 13 corresponding to the output shafts 10 and the auxiliary shafts 10' in different sets are farther away from each other, so that different sets of output shafts do not interfere with each other and independently perform rotation output. The support holes 13 on the upper cover 12 or the lower cover 13 are arranged on a same circumference. In this embodiment, there are five sets of support holes 13, each set correspondingly supports one end of the output shaft 10 and one end of the auxiliary shaft 10' in a same set, and the other end of the output shaft 10 and the other end of the auxiliary shaft 10' are freely rotatably supported in the support holes 13 on the upper cover 11.

The gear ring 60 is of an annular shape, and inner racks are axially, parallelly, and evenly disposed on an annular wall of the gear ring 60, and engage with and rotatably fit the lower end of the planetary gear 40. Gears of the sets of output shafts 10 and 10' are circumferentially distributed on an upper portion of the gear ring 60 and engage with the upper end of the planetary gear 40. The gear ring 60 is located inside a circular track of the sets of output shafts 10 and 10', and an upper end surface of the gear ring 60 is close to lower end surfaces (shown in FIG. 6) of the gear portion 102 of the sets of output shafts 10 and 10', so that the lower ends of the output shafts 10 and the auxiliary shafts 10' are located outside an annular side wall of the gear ring 60 and extend towards the lower cover 12.

A lower end surface of the gear ring 60 presses against the bottom disc 70. The bottom disc 70 is of a circular shape, fits the annular gear ring 60, and covers the lower end surface of the gear ring 60. The bottom disc 70 and the gear ring 60 are fixedly connected by using a gear ring fixing shaft 75, to form an integrated structure. Referring to FIG. 10(a) and FIG. 10(b), an upper end surface of the bottom disc 70 that faces the annular gear ring 60 is provided with the vertical gear ring fixing shaft 75 strictly clamped to an inner wall of the gear ring 60, to fix the bottom disc 70 and the gear ring 60. Certainly, the gear ring 60 and the bottom disc 70 may alternatively be fixed together in another manner, or may directly be of a non-separable integral structure, and the bottom disc 70 is used as the bottom portion of the gear ring 60. A lower end surface of the bottom disc 70 faces the lower cover 12 and is provided with a unidirectional clamping block fixing base 72 and a limiting block 73. An end surface of the center hole 71 of the bottom disc 70 that faces the lower cover 12 is provided with a cylindrical protrusion 74, and the cylindrical protrusion 74 is freely rotatably sleeved in the center hole 91 of the unidirectional gear 90. The lower end of the input shaft 30 is inserted into the center of the gear ring 60 and the center hole 71 of the bottom disc 70, and is eventually supported in the center hole 91 of the unidirectional gear 90. The unidirectional gear 90 is fixed to the lower cover 12, to enable the gear ring 60 and the bottom disc 70 to be rotatably mounted in the housing 1 and between the upper and lower covers 11 and 12.

The position selection gear, that is, the unidirectional gear 90, is fixed to the lower cover 12. The unidirectional gear 90 is in a shape of a disc, and several bevel gears 93 are codirectionally, for example, clockwise (or counterclockwise), disposed on a circumference. Several (three centrosymmetrically arranged in this embodiment) unidirectional clamping blocks 80 are rotatably mounted on the lower end surface of the bottom disc 70, and may unidirectionally rotate to another direction to be strictly clamped with and fit the unidirectional gear 90. The unidirectional clamping blocks 80 and the unidirectional gear 90 form the unidirectional control assembly 8 which may perform unidirectional (for example, clockwise or counterclockwise) relative rotation and rotate in opposite directions to be strictly clamped. A surface of the unidirectional gear 90 that faces the lower cover 12 is a lower end surface, and the lower end surface is provided with several unidirectional gear fixing shafts 92 that are axially parallel to each other. To ensure stability of the antenna transmission apparatus 100, three unidirectional gear fixing shafts 92 are centrosymmetrically disposed on the lower end surface. Correspondingly, unidirectional gear fixing holes 15 are centrosymmetrically disposed on the lower cover 12. Free ends of the unidirectional gear fixing shafts 92 are respectively sleeved in the unidirectional gear fixing holes 15, to fix the lower end surface of the unidirectional gear 90 to the lower cover 12 of the transmission apparatus by using the fixing shafts 92. The center hole 91 of the unidirectional gear 90 is sleeved over the cylindrical protrusion 74 at the center of the bottom disc 70, to mount the position selection gear 90 to the lower end surface of the bottom disc 70. The bottom disc 70 may rotate in relative to the position selection gear 90; and the unidirectional clamping blocks 80 are mounted on the lower end surface of the bottom disc 70 and press against backlashes of the bevel gears 93 of the position selection gear 90, and the unidirectional clamping blocks 80 may rotate with the bottom disc 70. Because of the effect of the unidirectional control assembly 8, the bottom disc 70 can only unidirectionally rotate, and correspondingly, the inner gear ring 60 can only unidirectionally rotate.

The lower end surface of the bottom disc 70 is provided with three (but is not limited to three) centrosymmetrical unidirectional clamping block fixing bases 72, and the unidirectional clamping blocks 80 fit the unidirectional clamping block fixing bases 72 on the bottom disc 70 by using shaft-hole fit. The unidirectional clamping blocks 80 are ratchet-wheels to limit motion of the inner gear ring 60 to unidirectional rotation, for example, rotating clockwise and not rotating counterclockwise.

Free end portions of the unidirectional clamping blocks 80 press against backlashes between the bevel gears of the position selection 90, can rotate by getting rid of the clamping effect by rotating in an oblique direction of the bevel gears 93, and cannot rotate by being strictly clamped with the bevel gears 93 by rotating in an opposite direction of the oblique direction of the bevel gears 93. The limiting blocks 73 press against outer sides of tail ends of the unidirectional clamping blocks 80, to limit a swinging extent of the free ends of unidirectional clamping blocks 80 around the fixing bases 72, to facilitate structure stability, and to not interfere with the lower ends of the output shaft 10 and 10'.

In this embodiment of the present invention, a center hole 54 of the planetary bracket 50 is pin-connected to the input shaft 30 and the bottom disc 70. The planetary bracket 50 and the bottom disc 70 freely rotate, but cannot axially move.

The center of the upper cover 11 (referring to FIG. 3 and FIG. 8) is provided with a center hole 18 configured to support the upper end of the input shaft 30, a circumference of the center hole 18 is provided with a circle of unidirectional positioning holes 14, and the unidirectional positioning holes 14 are disposed on a bottom inner side surface of the upper cover 11. Specifically, an outer portion that is of the circumference of the center hole 18 of the upper cover 11 and that faces the housing 1 is provided with an annular protrusion portion 112, several unidirectional positioning holes 14 are disposed on a bottom inner wall of the annular protrusion portion 112, unidirectional sliding surfaces 16 are formed towards a same circumferential direction, and the ball pin at the top of the planetary gear 40 fits each unidirectional positioning hole 14, to enable the planetary gear 40 to move along the unidirectional sliding surfaces 16 to a next positioning hole 14, to select a position. The unidirectional sliding surfaces 16 may also limit the planetary gear 40 to rotating in the positioning hole 14 rather than revolving. The annular protrusion portion 112 is used as a moving channel 112 on the top of the position selection mark 53, a rectangular protrusion portion is formed on a segment of the moving channel 112, is internally provided with a sensor (not shown) configured to sense a pass of the position selection mark 53, and is used as a zero position monitoring portion 113 of the position selection mark.

The position selection mark 53 rotates in the protrusion portion 112 of the upper cover, a position of the position selection mark 53 and a position of the planetary gear 40 may not be symmetrical but form an angle, the sensor (not shown) is mounted in the rectangular protrusion portion 113 of the upper cover 11, when the position selection mark 53 rotates and passes the rectangular protrusion portion 112, the position is defined as a zero position, and rotation times of the motor is controlled by using a program, to implement positioning of the output shaft 10. The positioning of the output shaft 10 refers to that the planetary gear 40 slides to the output shaft 10, to engage with and to be in transmission fit with the output shaft 10, so as to drive the output shaft 10 to perform rotation output. The input shaft 30 may alternatively be directly driven by the motor, but an interface needs to be designed. Therefore, it is more convenient that a motor shaft engages with the input shaft by using gears.

The inner gear ring 60 is fixed to the bottom disc 70, the unidirectional gear 90 is fixed to the lower cover 12, and a bottom disc assembly of the inner gear ring engages with the unidirectional gear 90 by using the unidirectional clamping blocks 80, to implement unidirectional rotation of the inner gear ring 60.

A process of position selection: The input shaft 30 rotates counterclockwise, drives the planetary gear 40 to rotate clockwise, and has a tendency to drive the inner gear ring 60 to rotate clockwise. However, the inner gear ring 60 can only rotate counterclockwise and cannot rotate clockwise, therefore, only the planetary bracket 50 rotates. Counterclockwise rotation of the input shaft 30 may implement the process of position selection.

An output process: After the planetary gear 40 reaches a designated output shaft 10, the input shaft 30 rotates clockwise, and the planetary gear 40 rotates counterclockwise. Because in this case, the telescopic shaft formed by the ball pin 41 of the planetary gear 40 may prevent, by using the unilateral positioning holes 14, the planetary bracket 50 from rotating clockwise, in this case, the planetary gear 40 equals a fixed shaft gear to implement output.

In this embodiment of the present invention, the inner gear ring 60 is added, and the inner gear ring 60 is limited by the ratchet-wheels 80 (unidirectional gear), can only unidirectionally (for example, clockwise) rotate, and cannot rotate counterclockwise. The upper end of the gear of the planetary gear 40 of the present invention always engages with one of the output shaft 10 and the auxiliary shaft 10', and the lower end of the gear of the planetary gear 40 always engages with inner racks of the inner gear ring 60. When a position is being selected, the input gear 20 rotates clockwise to drive the planetary gear 40 to rotate counterclockwise. If the inner gear ring 60 cannot rotate counterclockwise and can only rotate clockwise, the inner gear ring 60 is still. Correspondingly, the output shaft 10 and the auxiliary shaft 10' do not rotate, the planetary gear 40 revolves with rotation of the planetary bracket 50 around the annular inner wall of the inner gear ring 60 and the circular inner portion surrounded by the sets of output shafts, to the predetermined set 1 of output shafts to engage with the corresponding output shaft 10 and auxiliary shaft 10', thereby implementing position selection action. When output is performed, after the planetary gear 40 implements the position selection action and stops at a gear 10 or 10', the input gear 20 rotates counterclockwise, the planetary gear 40 rotates clockwise and drives the inner gear ring 60 to freely rotate clockwise, a unidirectional bevel slot 16 disposed on the upper cover 11 may prevent the planetary gear 40 from rotating counterclockwise to another positioning hole 14, so as to implement rotation output at a particular position. The unidirectional bevel slot 16 faces a direction same as a revolving direction of the planetary gear 40.

In the embodiments of the present invention, an example in which the unidirectional control assembly 8 controls the inner gear ring 60 to only rotate clockwise and not rotate counterclockwise is used for describing work principles. It may be understood that the unidirectional control assembly 8 may alternatively be designed to control the inner gear ring 60 to only rotate counterclockwise and not rotate clockwise. The working principles are similar.

The foregoing descriptions are merely preferred embodiments of the present invention, but are not intended to limit the present invention. Any modification, equivalent replacement, or improvement made without departing from the spirit and principle of the present invention should fall within the scope of the present invention.

What is claimed is:

1. An antenna transmission apparatus comprising:
    a housing including an upper cover and a lower cover;
    an input shaft;
    at least two sets of output shafts rotatably mounted between the upper cover and the lower cover, each set of the at least two sets of output shafts includes an output shaft and an auxiliary shaft in transmission fit with the output shaft;
    a planetary gear position selection assembly including a planetary gear; and
    a unidirectional control assembly driven by the input shaft to rotate the input shaft:
        (i) in a first rotation direction moving the planetary gear of the planetary gear position selection assembly along a track surrounded by the at least two sets of output shafts in the first rotation direction to a predetermined position at which the planetary gear is in transmission fit with one set of the at least two sets of output shafts, and
        (ii) in a second rotation direction, driving a corresponding output shaft of the one set of the at least two sets of output shafts at the predetermined position to rotate with the planetary gear, the second rotation direction being a reverse rotation direction relative to the first rotation direction, in the second rotation direction the planetary gear rotates in transmission fit with the output shaft or the auxiliary shaft in a same set of output shafts, the planetary gear being fixed at the predetermined position along the track when the input shaft is rotated in the second rotation direction, so as to respectively obtain bidirectional rotation output of the output shafts, wherein
    the input shaft is driven by external power to bidirectionally to drive the planetary gear to rotate in the first rotation direction or rotate in the second rotation direction.

2. The antenna transmission apparatus according to claim 1, wherein the transmission fit between the planetary gear and the input shaft and each set of output shafts is by gear engagement.

3. The antenna transmission apparatus according to claim 2, wherein:
    the planetary gear and the input shaft and each set of output shafts are respectively cylindrical gear shafts;
    an upper end and a lower end of each of the gear shafts correspond to the upper cover and the lower cover;
    an upper end and a lower end of each of the output shaft and the auxiliary shaft in each set of output shafts are respectively rotatably sleeved in support holes formed on the upper cover and the lower cover;

the lower end of the output shaft in each set of output shafts extends out of the support hole on the lower cover to perform rotational output;

an upper end and a lower end of the input shaft are respectively rotatably sleeved in center holes formed on the upper cover and the lower cover; and the input shaft is parallel to the output shafts.

4. A mobile antenna comprising:

a plurality of phase shifters; and the antenna transmission apparatus according to claim 3, wherein each phase shifter of the plurality of phase shifters is connected to a lower end of the output shaft of the antenna transmission apparatus by using a connection mechanism, and rotation output of the output shaft correspondingly adjusts the plurality of phase shifters.

5. The antenna transmission apparatus according to claim 2, wherein:

the planetary gear position selection assembly includes a gear ring, and a side wall of the gear ring is provided with axially parallel racks;

the planetary gear engages with the gear ring;

the unidirectional control assembly controls the gear ring to unidirectionally rotate;

the gear ring and the output shafts non-rotatably fit the planetary gear when the planetary gear rotates in the first rotation direction; and the gear ring and the output shafts rotatably fit the planetary gear when the planetary gear rotates in the second rotation direction.

6. The antenna transmission apparatus according to claim 5, wherein:

the gear ring is an inner gear ring, the racks are disposed on an annular inner side wall of the inner gear ring;

the planetary gear is located at an annular inner portion of the inner gear ring, and a lower end of the planetary gear engages with the inner gear ring;

each set of output shafts is arranged at a periphery of the inner gear ring, and an upper end of the planetary gear respectively engages with each set of output shafts; and the input shaft is located at a center of the inner gear ring and engages with the planetary gear.

7. A mobile antenna comprising:

a plurality of phase shifters; and the antenna transmission apparatus according to claim 6, wherein each phase shifter of the plurality of phase shifters is connected to a lower end of the output shaft of the antenna transmission apparatus by using a connection mechanism, and rotation output of the output shaft correspondingly adjusts the plurality of phase shifters.

8. The antenna transmission apparatus according to claim 5, wherein:

a lower end surface of the gear ring is provided with a bottom disc, and the bottom disc covers the lower end surface of the gear ring; and a center of the bottom disc is provided with a center hole, and a lower end of the input shaft extends through the center hole.

9. The antenna transmission apparatus according to claim 8, wherein:

the unidirectional control assembly includes several unidirectional clamping blocks and a unidirectional gear;

the unidirectional clamping blocks are clamped in backlashes of the unidirectional gear and unidirectionally relatively rotate to be tightly clamped in a reverse direction and fit the unidirectional gear;

the unidirectional clamping blocks are mounted on a lower end surface of the bottom disc of the gear ring and synchronically rotate with the bottom disc of the gear ring;

the unidirectional gear is fixed to the lower cover;

a center of the unidirectional gear is provided with a center hole;

a cylindrical protrusion is formed at the center of the bottom disc and is relatively rotatably sleeved in the center hole of the unidirectional gear; and the lower end of the output shaft relatively rotatably runs through the center hole of the bottom disc, the cylindrical protrusion, and the center hole of the unidirectional gear.

10. A mobile antenna comprising:

a plurality of phase shifters; and the antenna transmission apparatus according to claim 9, wherein each phase shifter of the plurality of phase shifters is connected to a lower end of the output shaft of the antenna transmission apparatus by using a connection mechanism, and rotation output of the output shaft correspondingly adjusts the plurality of phase shifters.

11. The antenna transmission apparatus according to claim 8, wherein:

the planetary gear position selection assembly includes a planetary bracket configured to support the planetary gear;

a center of the planetary bracket is provided with a center hole bearing sleeve;

the center hole bearing sleeve of the planetary bracket is rotatably sleeved in the center hole of the bottom disc;

the lower end of the input shaft relatively rotatably runs through the center hole bearing sleeve of the planetary bracket and the center hole of the bottom disc;

the planetary bracket is a frame-shaped bracket structure, the planetary bracket including a bottom portion and two side arms axially and parallelly extending upward from two ends of the bottom portion;

an angle exists between the two side arms and the two side arms are parallel to the input shaft;

the two side arms are respectively a bearing rotatably supporting the planetary gear and a position selection mark configured to relatively mark a position of the planetary gear;

a lower end of the planetary gear is rotatably sleeved over the bearing of the planetary bracket, and an upper end of the planetary gear is provided with a ball pin;

the upper cover is provided with several unidirectional positioning holes;

each positioning hole includes a unidirectional sliding surface facing a same direction;

the planetary gear moves, when rotating in the first rotation direction, towards the direction of the unidirectional sliding surface and along an arrangement track of the unidirectional positioning holes to the predetermined positioning holes by using the ball pin at the upper end of the planetary gear; and when the planetary gear rotates in the second rotation direction opposite to the first rotation direction, the planetary gear are limited in the positioning holes by the unidirectional positioning holes, rotate in the second rotation direction, and engage with the corresponding output shaft or the auxiliary shaft.

12. The antenna transmission apparatus according to claim 11, wherein:

the upper cover is provided with an annular protrusion portion as a moving channel of the position selection mark; and the annular protrusion portion has a zero position monitoring portion for the position selection mark, and the zero position monitoring portion is internally provided with a sensor configured to sense a pass of the position selection mark, record the position as a zero position, and control rotation times of the planetary bracket to implement position selection of the output shaft.

13. A mobile antenna comprising:

a plurality of phase shifters; and the antenna transmission apparatus according to claim 12, wherein each phase shifter of the plurality of phase shifters is connected to a lower end of the output shaft of the antenna transmission apparatus by using a connection mechanism, and rotation output of the output shaft correspondingly adjusts the plurality of phase shifters.

14. A mobile antenna comprising:

a plurality of phase shifters; and the antenna transmission apparatus according to claim 11, wherein each phase shifter of the plurality of phase shifters is connected to a lower end of the output shaft of the antenna transmission apparatus by using a connection mechanism, and rotation output of the output shaft correspondingly adjusts the plurality of phase shifters.

15. A mobile antenna comprising:

a plurality of phase shifters; and the antenna transmission apparatus according to claim 8, wherein each phase shifter of the plurality of phase shifters is connected to a lower end of the output shaft of the antenna transmission apparatus by using a connection mechanism, and rotation output of the output shaft correspondingly adjusts the plurality of phase shifters.

16. A mobile antenna comprising:

a plurality of phase shifters and the antenna transmission apparatus according to claim 5, wherein each phase shifter of the plurality of phase shifters is connected to a lower end of the output shaft of the antenna transmission apparatus by using a connection mechanism, and rotation output of the output shaft correspondingly adjusts the plurality of phase shifters.

17. A mobile antenna comprising:

a plurality of phase shifters; and the antenna transmission apparatus according to claim 2, wherein each phase shifter of the plurality of phase shifters is connected to a lower end of the output shaft of the antenna transmission apparatus by using a connection mechanism, and rotation output of the output shaft correspondingly adjusts the plurality of phase shifters.

18. A mobile antenna comprising:

a plurality of phase shifters; and the antenna transmission apparatus according to claim 1, wherein each phase shifter of the plurality of phase shifters is connected to a lower end of the output shaft of the antenna transmission apparatus by using a connection mechanism, and rotation output of the output shaft correspondingly adjusts the plurality of phase shifters.

* * * * *